United States Patent
Morrison et al.

(10) Patent No.: US 9,751,138 B2
(45) Date of Patent: Sep. 5, 2017

(54) COMPOSITE MILLING CUTTER

(71) Applicant: Kennametal Inc., Latrobe, PA (US)

(72) Inventors: Lewis Ray Morrison, Latrobe, PA (US); Ravishankar Iyer, North Huntingdon, PA (US); Mark A. Kerin, Blairsville, PA (US)

(73) Assignee: KENNAMETAL INC., Latrobe, PA (US)

( * ) Notice: Subject to any disclaimer, the term of this patent is extended or adjusted under 35 U.S.C. 154(b) by 220 days.

(21) Appl. No.: 14/631,905

(22) Filed: Feb. 26, 2015

(65) Prior Publication Data

US 2016/0250696 A1    Sep. 1, 2016

(51) Int. Cl.
*B23C 5/08*    (2006.01)
*B23C 5/26*    (2006.01)
(Continued)

(52) U.S. Cl.
CPC .............. *B23C 5/26* (2013.01); *B23C 5/006* (2013.01); *B23C 5/08* (2013.01); *B23F 21/128* (2013.01);
(Continued)

(58) Field of Classification Search
CPC ....... B23C 2210/02; B23C 5/26; B23C 5/006; B23C 5/08; Y10T 407/1934;
(Continued)

(56) References Cited

U.S. PATENT DOCUMENTS 3,764,224 A * 10/1973 Merz ................. B23D 77/10
                                                    279/2.12
4,204,787 A    5/1980 McCray et al.
(Continued)

FOREIGN PATENT DOCUMENTS

CA    2679230 A1 *  9/2008  ............. B23C 5/006
DE    19522452 C1 * 5/1996  ............. B23B 31/00
(Continued)

OTHER PUBLICATIONS

DE 102008016636 Machine Translation, pp. 5-7, Nov. 18, 2016.*
DE 19522452 Machine Translation, pp. 5-9, Nov. 28, 2016.*

*Primary Examiner* — Daniel Howell
*Assistant Examiner* — Nicole N Ramos
(74) *Attorney, Agent, or Firm* — Matthew S. Bedsole

(57) ABSTRACT

A composite milling cutter includes a rotatable adapter plate and ring cutter. The adapter plate has a raised key portion with a peripheral side wall having a plurality of curved abutment surfaces symmetrically located on an inscribed circle, $IC_{AP}$ defined by the raised key portion. The cutter ring has an opening with a peripheral side wall for receiving the raised key portion of the adapter plate. The peripheral side wall has a plurality of curved abutment surfaces complimentary in shape to the curved abutment surfaces of the adapter plate and symmetrically located on an inscribed circle, $IC_{CR}$, defined by the opening. A tolerance between the abutment surfaces of the peripheral side wall of the raised key portion and the abutment surfaces of the peripheral wall of the opening is such that run-out is minimized.

16 Claims, 4 Drawing Sheets

(51) Int. Cl.
*B23F 21/12* (2006.01)
*B23C 5/00* (2006.01)

(52) U.S. Cl.
CPC ..... *B23C 2210/02* (2013.01); *Y10T 407/1934* (2015.01); *Y10T 409/309408* (2015.01)

(58) Field of Classification Search
CPC ..... Y10T 407/1936; Y10T 409/309408; Y10T 409/30952
USPC .................................................... 279/93, 94
See application file for complete search history.

(56) References Cited

U.S. PATENT DOCUMENTS

| | | | |
|---|---|---|---|
| 5,137,402 A | | 8/1992 | Ball et al. |
| 5,197,231 A | | 3/1993 | Pedersen et al. |
| 5,215,417 A | | 6/1993 | Ball et al. |
| 5,868,529 A | | 2/1999 | Rothballer et al. |
| 6,488,456 B1 | * | 12/2002 | Satran ............ B23C 5/08 29/447 |
| 9,168,595 B2 | * | 10/2015 | Heinloth ........ B23C 5/006 |
| 2006/0120813 A1 | * | 6/2006 | Satran ............ B23C 5/006 407/48 |
| 2012/0039676 A1 | * | 2/2012 | Marshansky ..... B23C 5/1054 407/48 |
| 2012/0257940 A1 | * | 10/2012 | Gowda ........... B23C 5/06 409/131 |

FOREIGN PATENT DOCUMENTS

| | | | | |
|---|---|---|---|---|
| DE | 102008016636 A1 | * | 10/2009 | ............ B23C 5/006 |
| GB | 695778 | | 8/1953 | |
| GB | 834490 | | 5/1960 | |
| JP | 2000-015516 A2 | | 1/2000 | |

\* cited by examiner

COMPOSITE MILLING CUTTER

BACKGROUND OF THE INVENTION

The invention relates generally to rotary cutters and, more particularly, relates to ring cutters for machining gears, couplings and the like.

Ring cutters having a plurality of cutting elements mounted on the periphery of the ring cutter have been known for many years in the art of milling. The existing ring cutter design includes an adapter plate, which is mounted onto a spindle and a cutter ring, which is secured to the adapter plate. The customer still finds it difficult to mount the cutter ring onto the adapter plate because of close tolerances between the cutter ring and the adapter plate. Even a slight tilt in the axis due to the weight of the cutter ring will make the mounting of the cutter ring onto the adapter plate very difficult.

However, mounting a cutter ring on a spindle or mounting a cutter ring on a cutter head requires a precise fit of the cutter ring base and side mounting surfaces to the mounting surfaces of the spindle or head. If a cutter ring is not precisely mounted to a cutter head or machine spindle, the cutter ring will not rotate true about the axis of rotation of the machine spindle. The non-true rotation, known as run-out, can occur radially and/or axially with respect to the axis of rotation of the cutter head and machine spindle. A cutter ring rotating in this manner will result in imprecisely formed tooth geometry on a workpiece, such as a gear or gear blank.

SUMMARY OF THE INVENTION

What is needed is an effective feature to minimize run-out in a composite milling cutter. Therefore, the present invention has been developed in view of the foregoing.

In one aspect of the invention, a composite milling cutter includes a rotatable adapter plate having a raised key portion with a peripheral side wall. The peripheral side wall has a plurality of curved abutment surfaces symmetrically located about an inscribed circle, $IC_{AP}$, defined by the raised key portion. The milling cutter also includes a cutter ring having an opening with a peripheral side wall for receiving the raised key portion of the adapter plate. The peripheral side wall has having a plurality of curved abutment surfaces complimentary in shape to the abutment surfaces of the adapter plate and symmetrically located about an inscribed circle, $IC_{CR}$, defined by the opening. A tolerance between the abutment surfaces of the peripheral side wall of the raised key portion and the abutment surfaces of the peripheral wall of the opening is such that run-out is minimized.

In another aspect of the invention, a composite milling cutter includes a rotatable adapter plate having a raised key portion with a peripheral side wall. The peripheral side wall has a plurality of curved abutment surfaces symmetrically located about an inscribed circle, $IC_{AP}$, defined by the raised key portion. The raised key portion further includes a plurality of lobes extending radially outward with respect to the inscribed circle, $IC_{AP}$. The milling cutter further includes a cutter ring having an opening with a peripheral side wall for receiving the raised key portion of the adapter plate. The peripheral side wall has a plurality of curved abutment surfaces symmetrically located about an inscribed circle, $IC_{CR}$, defined by the opening. The cutter ring further includes a plurality of lobe-shaped openings extending radially outward with respect to an inscribed circle, $IC_{CR}$. A tolerance between the abutment surfaces of the peripheral side wall of the raised key portion and the abutment surfaces of the peripheral wall of the opening minimizes run-out, and a tolerance between the lobe abutment surfaces of the adapter plate and the lobe abutment surfaces of the cutter ring minimizes relative rotation of the adapter plate with respect to the cutter ring.

In yet another aspect of the invention, a composite milling cutter includes a rotatable adapter plate having a raised key portion with a peripheral side wall. The peripheral side wall has a plurality of curved abutment surfaces symmetrically located about an inscribed circle, $IC_{AP}$, defined by the raised key portion. The peripheral side wall further includes a plurality of lobe abutment surfaces, and the raised key portion further includes a plurality of lobes extending radially outward with respect to the inscribed circle, $IC_{AP}$. The milling cutter further includes a cutter ring having an opening with a peripheral side wall for receiving the raised key portion of the adapter plate. The peripheral side wall has having a plurality of curved abutment surfaces symmetrically located about an inscribed circle, $IC_{CR}$, defined by the opening. The peripheral side wall of the cutter ring further includes a plurality of lobe abutment surfaces, and the cutter ring further includes a plurality of lobe-shaped openings extending radially outward with respect to an inscribed circle, $IC_{CR}$. A tolerance between the convex abutment surfaces of the peripheral side wall of the raised key portion and the concave abutment surfaces of the peripheral side wall of the opening minimizes run-out, and a tolerance between the lobe abutment surfaces of the adapter plate and the lobe abutment surfaces of the cutter ring minimizes relative rotation of the adapter plate with respect to the cutter ring.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 2 is a top view of the composite milling cutter illustrated in

FIG. 1;

DETAILED DESCRIPTION OF THE INVENTION

Figure 1:
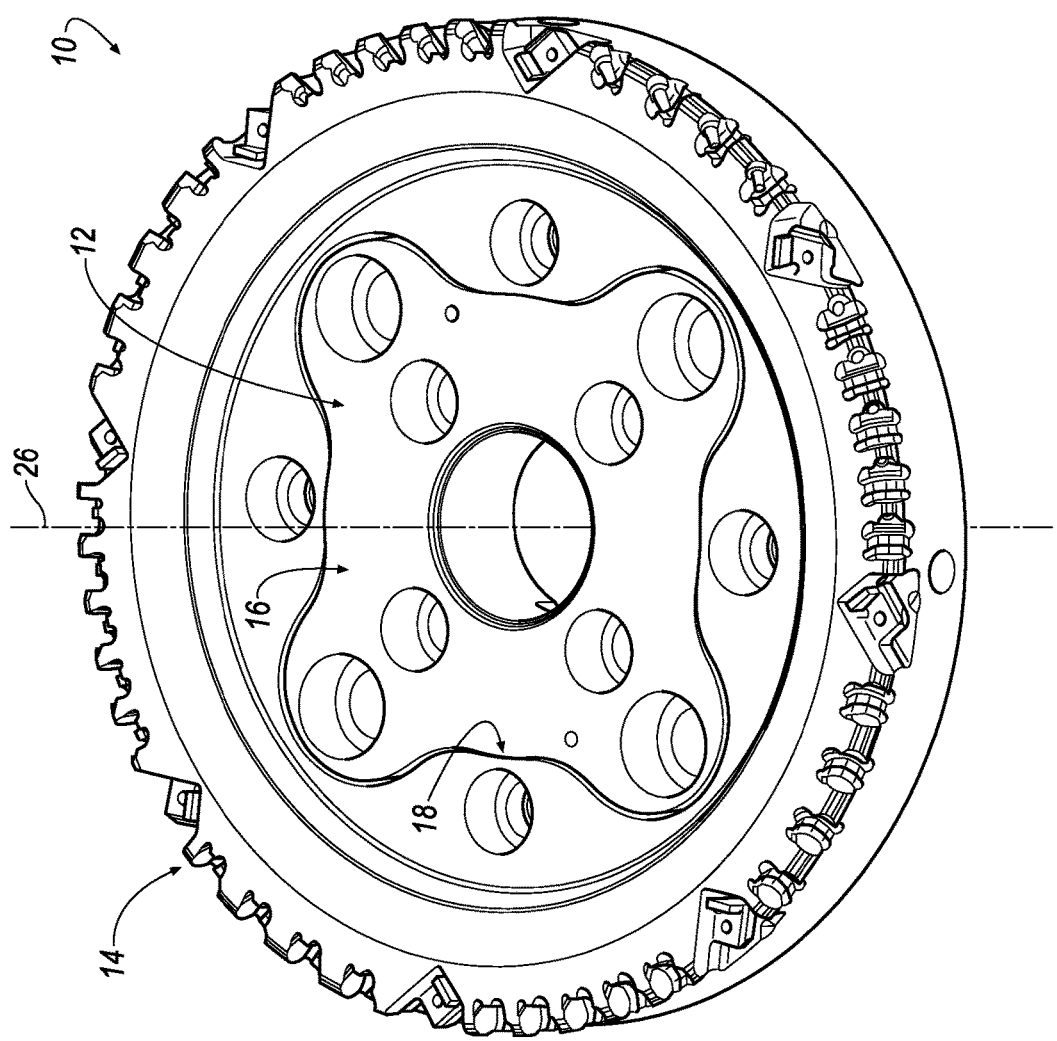
FIG. 1 is a perspective view of a composite milling cutter according to an aspect of the invention.
Figure 2:
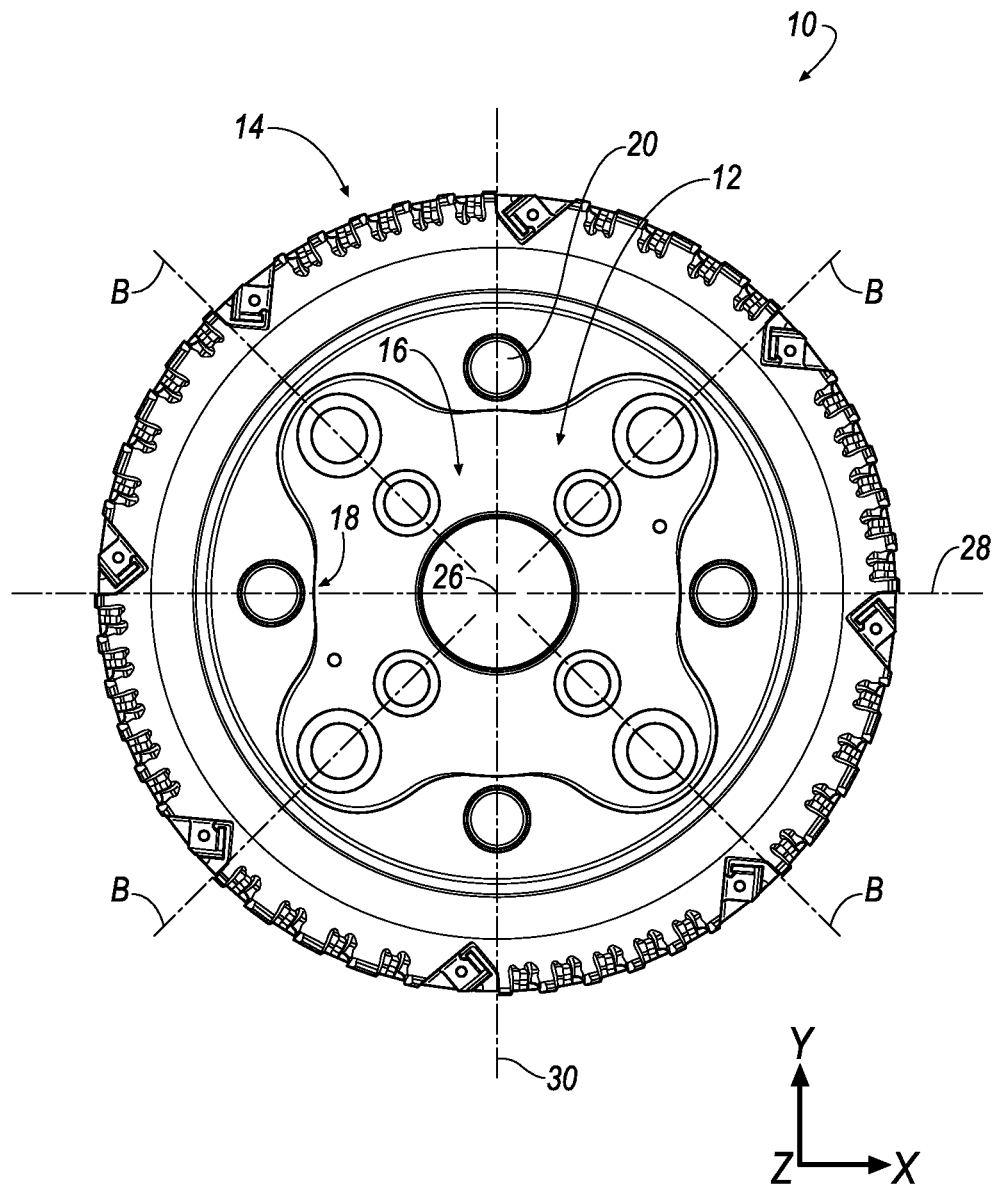

Referring to FIGS. 1-4, there is illustrated a composite milling cutter 10, in accordance with an aspect of the invention. The composite milling cutter 10 comprises a rotatable adapter plate 12 having a cutter ring 14 mounted thereon. The rotatable adapter plate 12 has a raised key portion 16 with a peripheral side wall, shown generally at 17, that extends through an opening 18 with a peripheral side wall, shown generally at 19, formed in the cutter ring 14.

The cutter ring 14 is mounted onto the rotatable adapter plate 12 by using a plurality of threaded fasteners 20, such as bolts and the like, that are passed through holes 22 in the cutter ring 14 and threaded into mounting holes 24 in the rotatable adapter plate 12. The threaded fasteners 20 are symmetrically located about the central axis 22. In the illustrated embodiment, a pair of threaded fasteners 20 are located on opposite sides of the central axis 26 on a line 28 parallel to the x-axis and passing through the central axis 22. Similarly, a pair of threaded fasteners 20 are located on opposite sides of the central axis 26 on a line 30 parallel to the y-axis and passing through the central axis 22. Because the lines 28, 30 are ninety (90) degrees with respect to each other, the threaded fasteners 20 are centrally located ninety (90) degrees apart from each other with respect to the central axis 26.

Figure 3:
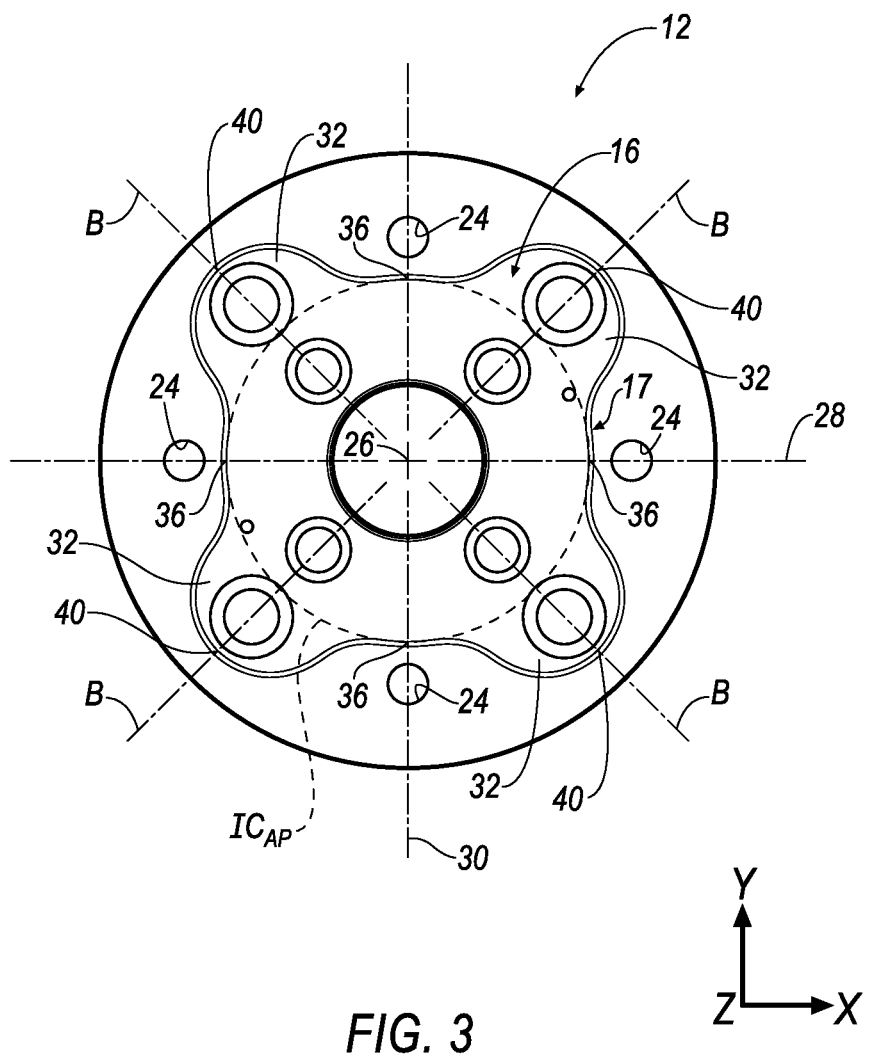
FIG. 3 is a top view of an adapter plate of the composite milling cutter according to an aspect of the invention.
Figure 4:
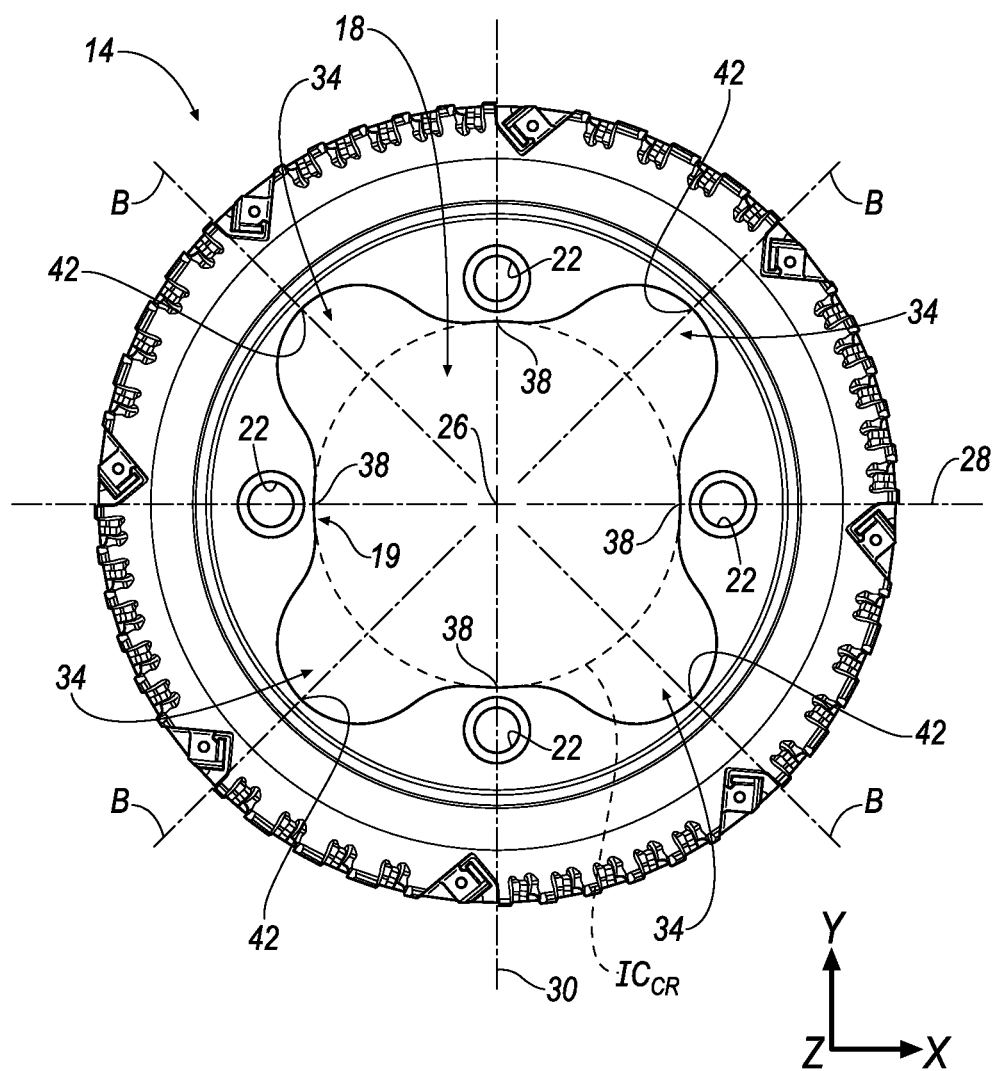
FIG. 4 is a top view of a cutter ring of the composite milling cutter according to an aspect of the invention.

Referring to FIGS. 3 and 4, the raised key portion 16 of the adapter plate 12 has a plurality of radially extending lobes 32 symmetrically located with respect to the central axis 26. The lobes 32 are substantially identical to each other and extend radially outward with respect to an inscribed circle, $IC_{AP}$, defined by the raised key portion 16. In the illustrated embodiment, each lobe 32 is centrally located on a bisector, B, of the lines 28, 30 that pass through the central axis 26. In other words, each lobe 32 is centrally located at an angle of forty-five (45) degrees with respect to the lines 28, 30. Thus, the lobes 32 are located ninety (90) degrees apart from each other and are centrally located at an angle of forty-five (45) degrees with respect to the lines 28, 30.

Similarly, the opening 18 of the cutter ring 14 has a plurality of radially extending lobe-shaped openings 34 symmetrically located with respect to the central axis 26 for accommodating the lobes 32 of the adapter plate 12. The lobe-shaped openings 34 extend radially outward with respect to an inscribed circle, $IC_{CR}$, defined by the opening 18. Similar to the lobes 32, each lobe-shaped opening 34 is centrally located on a bisector, B, between the lines 28, 30 that pass through the central axis 26. In other words, each lobe-shaped opening 34 is centrally located at an angle of forty-five (45) degrees with respect to the lines 28, 30. Thus, the lobe-shaped openings 34 are located ninety (90) degrees apart from each other and are centrally located at an angle of forty-five (45) degrees with respect to the lines 28, 30.

One aspect of the invention is that the peripheral side wall 17 of the raised key portion 16 of the adapter plate 12 has a plurality of curved abutment surfaces 36 symmetrically located on the inscribed circle, $IC_{AP}$, defined by the raised key portion 16. In addition, the curved abutment surfaces 36 are centrally located on the lines 28, 30 that pass through the central axis 26. In the illustrated embodiment, the raised key portion 16 has a total of four (4) convex abutment surfaces 36 that are centrally located on the lines 28, 30 and located ninety (90) degrees apart from each other.

Similarly, the peripheral side wall 19 of the cutter ring 14 has a plurality of curved abutment surfaces 38 symmetrically located on the inscribed circle, $IC_{CR}$, defined by the opening 18 of the cutter ring 14. Specifically, the curved abutment surfaces 38 are centrally located on the lines 28, 30 that pass through the central axis 26. The curved abutment surfaces 38 of the cutter ring 14 are complimentary in shape to the curved abutment surfaces 36 of the adapter plate 12. In the illustrated embodiment, the curved abutment surfaces 36 of the adapter plate 14 are convex in shape and are centrally located on the lines 28, 30 and ninety (90) degrees apart from each other, and the curved abutments surfaces 38 of the cutter ring 14 are concave in shape.

It will be appreciated that the invention is not limited by the adapter plate 12 having a plurality of convex abutment surfaces 36 and the cutter ring 14 having a plurality of concave abutment surfaces 38. For example, the invention can be practiced with the adapter plate 12 having a plurality of concave abutment surfaces 36 and the cutter ring 14 having a plurality of convex abutment surfaces 38, so long as the curved abutment surfaces 38 of the cutter ring 14 are complimentary in shape to the curved abutment surfaces 36 of the adapter plate 12.

Another aspect of the invention is that the peripheral side wall 17 of the raised key portion 16 of the adapter plate 12 has a plurality of curved lobe abutment surfaces 40 centrally located on the bisector, B, between the lines 28, 30 that pass through the central axis 26. In other words, each lobe abutment surface 40 is centrally located at an angle of forty-five (45) degrees with respect to the lines 28, 30. Thus, the lobe abutment surfaces 40 are located ninety (90) degrees apart from each other and are centrally located at an angle of forty-five (45) degrees with respect to the lines 28, 30.

Similarly, the peripheral side wall 19 of the cutter ring 14 has a plurality of curved lobe abutment surfaces 42 centrally located on the bisector, B, between the lines 28, 30 that pass through the central axis 26. In other words, each lobe abutment surface 42 is centrally located at an angle of forty-five (45) degrees with respect to the lines 28, 30. Thus, the lobe abutment surfaces 42 are located ninety (90) degrees apart from each other and are centrally located at an angle of forty-five (45) degrees with respect to the lines 28, 30.

As mentioned above, mounting a cutter ring on a spindle or mounting a cutter ring on a cutter head requires a precise fit of the cutter ring base and side mounting surfaces to the mounting surfaces of the spindle or head. If a cutter ring is not precisely mounted to a cutter head or machine spindle, the cutter ring will not rotate true about the axis of rotation of the machine spindle.

To precisely mount the cutter ring 14 onto the adapter plate 12, the diameter of the inscribed circle, $IC_{AP}$, defined by the raised key portion 16 of the adapter plate 12 is slightly smaller than the diameter of the inscribed circle, $IC_{CR}$, defined by the opening 18 of the cutter ring 14. For example, the difference between the diameters of the inscribed circles, $IC_{AP}$, $IC_{CR}$, (i.e. tolerance) is less than 15 microns. In the illustrated embodiment, the difference between the diameters between the convex abutment surfaces 36 of the adapter plate 12 and the concave abutment surface 38 of the cutter ring 14 is only about 0.0095 mm (about 9.5 microns). In addition, the convex shape of the abutment surfaces 36 and the concave shape of the abutment surfaces 38 precisely positions the adapter plate 12 relative to the cutter ring 14. As a result, run-out is minimal during a machining operation.

In addition, the adapter plate 12 and the cutter ring 14 are formed to allow about a 2 mm tolerance between the lobe abutment surfaces 40 of the adapter plate 12 and the lobe abutment surfaces 42 of the cutter ring 14. As a result, the relative rotation of the adapter plate 12 with respect to the cutter ring 14 has a maximum of about 1 mm before lockup between the adapter plate 12 and the cutter ring 14. In summary, the very tight tolerance between the convex abutment surfaces 36 of the adapter plate 12 and the concave abutment surfaces 38 of the cutter ring 14, the curved shape of the abutment surfaces 36, 38, and the tolerance between the lobe abutment surfaces 40, 42 allow the composite milling cutter 10 to be easily assembled and operated with minimal run-out.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A composite milling cutter, comprising:
a rotatable adapter plate having a raised key portion with a peripheral side wall, the peripheral side wall having a plurality of curved abutment surfaces symmetrically located on an inscribed circle, $IC_{AP}$, defined by the raised key portion; and
a cutter ring having an opening with a peripheral side wall for receiving the raised key portion of the adapter plate, the peripheral side wall having a plurality of curved abutment surfaces complimentary in shape to the curved abutment surfaces of the adapter plate and symmetrically located on an inscribed circle, $IC_{CR}$, defined by the opening,
Wherein a tolerance between the abutment surfaces of the peripheral side wall of the raised key portion and the abutment surfaces of the peripheral wall of the opening is such that run-out is minimized;
wherein the raised key portion further comprises a plurality of lobes extending radially outward with respect to the inscribed circle, $IC_{AP}$;
wherein the cutter ring further comprises a plurality of lobe-shaped openings extending radially outward with respect to the inscribed circle, $IC_{CR}$; and
wherein the tolerance between the abutment surfaces of the peripheral side wall of the raised key portion and the abutment surfaces of the peripheral wall of the opening is tighter than a tolerance between the plurality of lobes and the plurality of lobe-shaped openings.

2. The composite milling cutter of claim 1, wherein the composite milling cutter defines a central axis, a Y-axis which is perpendicular to and passes through the central axis, and an X-axis which is perpendicular to the central axis and the Y-axis and which passes through the central axis; and
wherein a center of each of the curved abutment surfaces of the adapter plate are centrally located on lines that pass through a central axis one of the X-axis and the Y-axis of the composite milling cutter, and wherein a center of each of the curved abutment surfaces of the cutter ring are centrally located on lines that pass through the central axis one of the X-axis and the Y-axis of the composite milling cutter.

3. The composite milling cutter of claim 1, wherein the raised key portion has a total of four convex abutment surfaces that are located ninety degrees apart from each other, and wherein the cutter ring has a total of four concave abutment surfaces that are located ninety degrees apart from each other.

4. The composite milling cutter of claim 1, wherein the peripheral wall of the raised key portion further comprises a plurality of lobe abutment surfaces, and wherein the peripheral side wall of the cutter ring further comprises a plurality of lobe abutment surfaces.

5. The composite milling cutter of claim 4, wherein the composite milling cutter defines a central axis, a Y-axis which is perpendicular to and passes through the central axis, and an X-axis which is perpendicular to the central axis and the Y-axis and which passes through the central axis; and
wherein a center of each of the plurality of lobe abutment surfaces of the raised key portion are located on a bisector, B, between the X-axis and the Y-axis of the composite milling cutter, and wherein a center of each of the plurality of lobe abutment surfaces of the cutter ring are located on the bisector, B, between the X-axis and the Y-axis of the composite milling cutter.

6. The composite milling cutter of claim 4, wherein the lobe abutment surfaces of the raised key portion are located ninety degrees apart from each other, and wherein the lobe abutment surfaces of the cutter ring are located ninety degrees apart from each other.

7. The composite milling cutter of claim 4, wherein a tolerance between the lobe abutment surfaces of the adapter plate and the lobe abutment surfaces of the cutter ring minimizes relative rotation of the adapter plate with respect to the cutter ring.

8. The composite milling cutter of claim 7, wherein the tolerance between the lobe abutment surfaces of the adapter plate and the lobe abutment surfaces of the cutter ring is 1 mm.

9. The composite milling cutter of claim 1, wherein the tolerance between the abutment surfaces of the peripheral side wall of the raised key portion and the abutment surfaces of the peripheral wall of the opening is less than 15 microns.

10. A composite milling cutter, comprising:
a rotatable adapter plate having a raised key portion with a peripheral side wall, the peripheral side wall having a plurality of curved abutment surfaces symmetrically located on an inscribed circle, $IC_{AP}$, defined by the raised key portion, the raised key portion further comprising a plurality of lobes extending radially outward with respect to the inscribed circle, $IC_{AP}$; and
a cutter ring having an opening with a peripheral side wall for receiving the raised key portion of the adapter plate, the peripheral side wall having a plurality of curved abutment surfaces complimentary in shape to the curved abutment surfaces of the adapter plate and symmetrically located on an inscribed circle, $IC_{CR}$, defined by the opening, the cutter ring further comprises a plurality of lobe-shaped openings extending radially outward with respect to the inscribed circle, $IC_{CR}$, wherein a tolerance between the curved abutment surfaces of the peripheral side wall of the raised key portion and the curved abutment surfaces of the peripheral side wall of the opening minimizes run-out, and
wherein a tolerance between the lobe abutment surfaces of the adapter plate and the lobe abutment surfaces of the cutter ring minimizes relative rotation of the adapter plate with respect to the cutter ring; and
wherein the tolerance between the lobe abutment surfaces of the adapter plate and the lobe abutment surfaces of the cutter ring permits a maximum relative rotation of about 1 mm.

11. The composite milling cutter of claim 10, wherein the composite milling cutter defines a central axis, a Y-axis which is perpendicular to and passes through the central axis, and an X-axis which is perpendicular to the central axis and the Y-axis and which passes through the central axis; and
wherein a center of each of the curved abutment surfaces of the adapter plate are centrally located on lines that pass through a central axis one of the X-axis and the Y-axis of the composite milling cutter, and wherein a center of each of the curved abutment surfaces of the cutter ring are centrally located on lines that pass through the central axis one of the X-axis and the Y-axis of the composite milling cutter.

12. The composite milling cutter of claim 10, wherein the raised key portion has a total of four convex abutment surfaces that are located ninety degrees apart from each other, and wherein the opening has a total of four concave abutment surfaces that are located ninety degrees apart from each other.

13. A composite milling cutter, comprising:
a rotatable adapter plate having a raised key portion with a peripheral side wall, the peripheral side wall having a plurality of curved abutment surfaces symmetrically located on an inscribed circle, $IC_{AP}$, defined by the raised key portion, the peripheral side wall further comprising a plurality of lobe abutment surfaces, the raised key portion further comprising a plurality of lobes extending radially outward with respect to the inscribed circle, $IC_{AP}$; and
a cutter ring having an opening with a peripheral side wall for receiving the raised key portion of the adapter plate, the peripheral side wall having a plurality of curved abutment surfaces complimentary in shape to the curved abutment surfaces of the adapter plate and symmetrically located on an inscribed circle, $IC_{CR}$, defined by the opening, the peripheral side wall of the cutter ring further comprises a plurality of lobe abutment surfaces, the cutter ring further comprises a plurality of lobe-shaped openings extending radially outward with respect to an inscribed circle, $IC_{CR}$,
wherein a tolerance between the curved abutment surfaces of the peripheral side wall of the raised key portion and the curved abutment surfaces of the peripheral side wall of the opening minimizes run-out, and
wherein a tolerance between the lobe abutment surfaces of the adapter plate and the lobe abutment surfaces of the cutter ring minimizes relative rotation of the adapter plate with respect to the cutter ring; and
wherein the tolerance between the lobe abutment surfaces of the adapter plate and the lobe abutment surfaces of the cutter ring is about 2 mm.

14. The composite milling cutter of claim 13, the composite milling cutter defines a central axis, a Y-axis which is perpendicular to and passes through the central axis, and an X-axis which is perpendicular to the central axis and the Y-axis and which passes through the central axis; and
wherein a center of each of the curved abutment surfaces of the adapter plate are centrally located on lines that pass through a central axis one of the X-axis and the Y-axis of the composite milling cutter, and wherein a center of each of the curved abutment surfaces of the cutter ring are centrally located on lines that pass through the central axis one of the X-axis and the Y-axis of the composite milling cutter.

15. The composite milling cutter of claim 13, wherein the lobe abutment surfaces of the raised key portion are located ninety degrees apart from each other, and wherein the lobe abutment surfaces of the cutter ring are located ninety degrees apart from each other.

16. The composite milling cutter of claim 13, wherein the curved abutment surfaces of the adapter plate have a convex shape, and wherein the curved abutment surfaces of the cutter ring have a concave shape.

* * * * *